No. 771,157. PATENTED SEPT. 27, 1904.
F. P. KELLEY.
WOOD SHAPING MACHINE.
APPLICATION FILED OCT. 27, 1903.
NO MODEL. 2 SHEETS—SHEET 1.
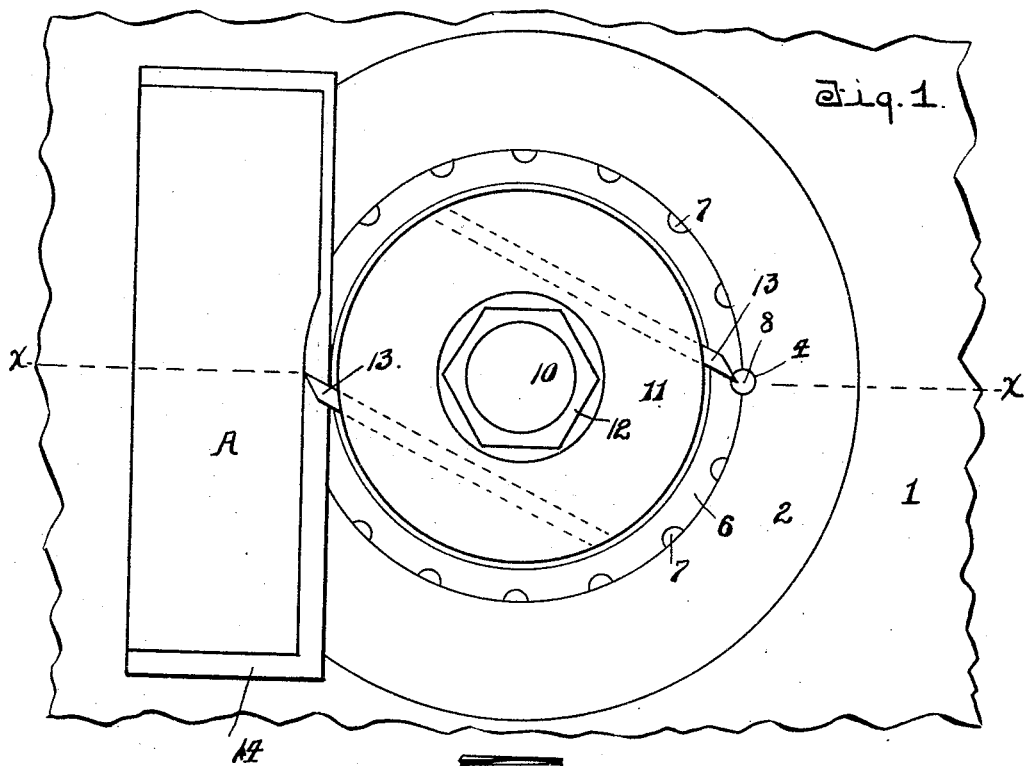
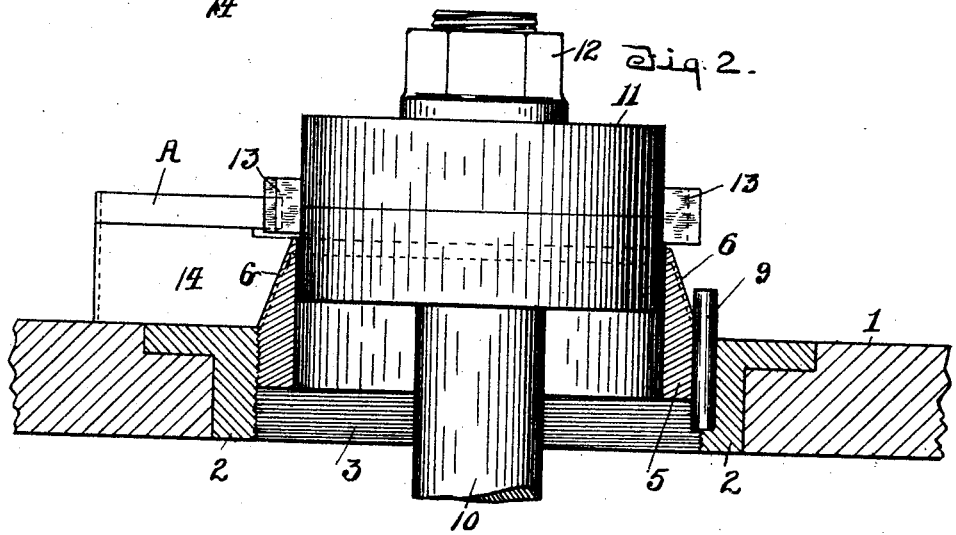
Witnesses:
George Oltsch.
Maggie Knoblock.
Frank P. Kelley.
Inventor
By Hendrick Alton
Atty.

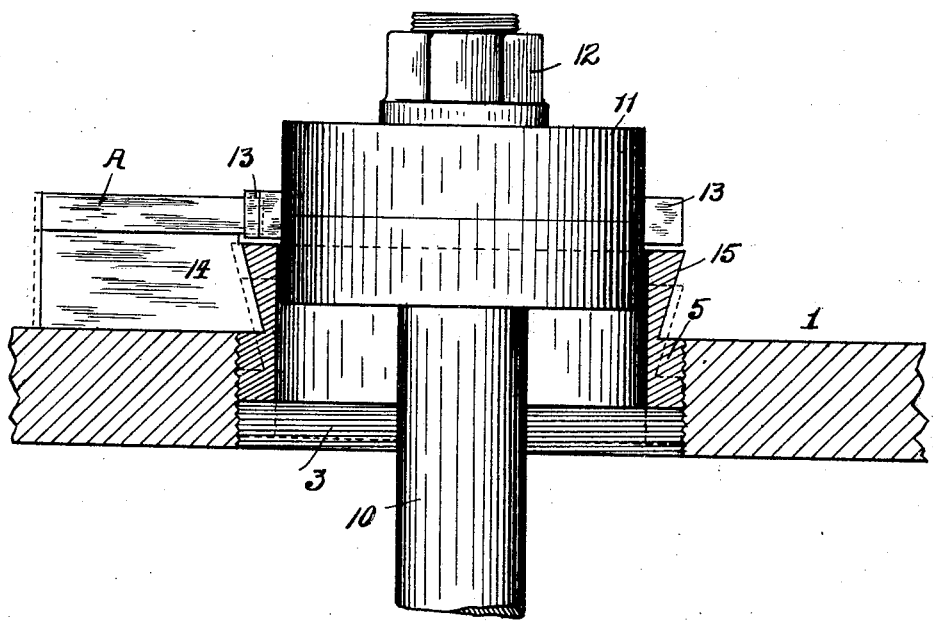

No. 771,157.

Patented September 27, 1904.

UNITED STATES PATENT OFFICE.

FRANK P. KELLEY, OF SOUTH BEND, INDIANA.

WOOD-SHAPING MACHINE.

SPECIFICATION forming part of Letters Patent No. 771,157, dated September 27, 1904.

Application filed October 27, 1903. Serial No. 178,738. (No model.)

*To all whom it may concern:*

Be it known that I, FRANK P. KELLEY, a citizen of the United States, residing at South Bend, in the county of St. Joseph and State of Indiana, have invented certain new and useful Improvements in Wood-Shaping Machines; and I do hereby declare the following to be a full, clear, and exact description of the invention, such as will enable others skilled in the art to which it appertains to make and use the same.

This invention relates to improvements in wood-shaping machines, and has especial reference to the construction and arrangement of the cutter-head and its correlated parts. In the use of these machines it becomes necessary from time to time to sharpen the cutters, which necessarily reduces them in length and width and possibly thickness, so that the depth or width of the cut made thereby is greater than the size originally intended, and the work is therefore not uniformly operated upon; but in the present invention this difficulty is obviated by associating with the cutter-head a relatively movable guide and gaging member which may be adjusted to permit the pattern and the work carried thereby to be brought closer to the cutters.

With this and other objects in view the invention consists in the construction, combination, and operative aggroupment of parts, all as will be more fully described hereinafter, illustrated in the accompanying drawings, and finally pointed out in the appended claims.

In the drawings, Figure 1 is a plan view of the cutter-head and a portion of the bed-plate of a machine embodying my invention. Fig. 2 is a vertical section on the line $x\,x$ of Fig. 1 with the cutter-head and its spindle shown in elevation. Fig. 3 is a view similar to Fig. 2, showing a modified form of a guide and gaging member and pattern.

Referring to the drawings, wherein similar reference notations indicate like parts appearing in the several illustrations, and reference being had thereto, 1 designates the bed-plate or table of a wood-shaping machine. This bed-plate is formed with an opening in which is mounted a suitable bushing 2, having its inner periphery screw-threaded, as at 3, and provided upon one side with a semicircular groove or recess 4, which is disposed longitudinally with the axis of the bushing and the purpose of which will appear hereinafter.

Mounted for vertical movement within the opening formed by the bushing 2 and engaging the screw-threads thereof is a work-guide and gaging member 5 of ring shape, with its outer upper edge beveled, as at 6, at an angle of approximately thirty degrees with the inner face thereof. This ring is so arranged in the bushing as to project more or less above the table. Within the periphery of this ring 5 are formed semicircular recesses or grooves 7, any of which may be brought into alinement with the semicircular groove or recess 4, formed in the contiguous face of the bushing 2, and when so alined a circular opening 8 is established, and in this circular opening may be fitted a key or locking-pin 9, which will hold the ring member against rotary movement.

Extending through the gaging-ring and disposed transversely to the table is a vertical spindle 10, having a cutter-head 11 rigidly mounted thereon, the upper end of the spindle being screw-threaded and engaged by a clamping-nut 12. This cutter-head is formed with horizontal slots in which are mounted suitable bolts or cutters 13, which may be held in place in any suitable manner. The cutter-head is of such diameter as to entirely close the opening at the top of the ring, while the cutters 13 project from the periphery thereof above the ring a suitable distance in order that the work, which is designated by A in the drawings, may be acted upon by the cutters, and while a straight chisel-edged cutter is shown in the drawings it is to be understood that cutters of different configuration for cutting different shapes upon the edges or in the sides of the work may be employed, and while two cutters are shown in the drawings only one or several may be used.

In the operation of machines of this character it is customary to employ a pattern-block to which the article to be shaped is first secured, and in the present instance the pattern-block 14 is formed with a beveled face corresponding to the beveled face 6 of the ring, and these beveled faces are in intimate contact and serve to guide the work as it is operated upon. These patterns are of the required size and shape and cannot be altered, and the knives of the revolving head are set so as to conform to the pattern; but when the knives have been sharpened and reduced in size the cut formed thereby is consequently reduced. It is one of the objects of the present invention to provide for this discrepancy which emanates from the constant sharpening of the cutters by providing the adjustable beveled gaging ring or member 5, and referring to Fig. 2 of the drawings it will be understood by reference to the dotted lines, which represent the position of the combined work-guide and gaging-ring when it has been screwed downwardly in the opening, that the pattern 14 and the work may be moved at right angles to the beveled gaging-ring to bring the beveled faces into contact, and this movement causes the work to be thrown closer to the cutter-head, and thereby compensates for the reduction in the size of the cutters. By means of the beveled faces a very minute and accurate adjustment may be made, since a partial rotation, and consequent vertical movement, of the ring will permit the pattern and work to be adjusted, and this adjustment is hardly perceptible, though sufficient to take up for the loss occurring by the sharpening of the cutters.

In Fig. 3 the combined work-guide and beveled gaging-ring 5 is shown formed with a bevel 15 extending in an opposite direction to that of the bevel 6 in Fig. 2, and while the same result is accomplished by the ring shown in Fig. 3 the inward adjustment of the work and pattern toward the cutter is made by screwing the ring upwardly instead of downwardly, and outward adjustment, which may be necessary for longer cutters, is made by screwing the ring downwardly to the position shown in dotted lines in Fig. 3. With the form of bevel 15 shown in Fig. 3 the pattern is beveled toward its upper edge instead of toward its lower edge, as shown in Fig. 2.

Having thus described my invention, what I claim, and desire to secure by Letters Patent, is—

1. The combination with the bed-plate, of a cutter having its shaft transverse to the bed-plate, and a beveled gaging-ring adjustable to project more or less above the surface of the bed-plate.

2. In a wood-shaping machine, the combination with the bed-plate and a rotating cutter, of a beveled gaging-ring mounted in the bed-plate and movable transversely thereto in a direction parallel with the axis of the cutter, and a pattern engaging with said beveled gaging-ring to adjust the work relatively to the cutters.

3. In a wood-shaping machine, the combination with a bed-plate and a rotary cutter, of a combined work-guide and gage having a threaded engagement with the bed-plate and provided with a beveled face normally disposed above the bed-plate and capable of being adjusted to control the cut of the cutter.

4. In a wood-shaping machine, the combination with a bed-plate and a rotary cutter, of a gaging-ring having a threaded engagement with the bed-plate and provided with a beveled face, a pattern having a beveled face engaging the beveled face of the gaging-ring, whereby the pattern with the work may be adjusted relatively to the cutter by the adjustment of the gaging-ring.

5. In a wood-shaping machine, the combination with a bed-plate and a vertical spindle extending therethrough and having a cutter mounted thereon, of a gaging-ring having a threaded engagement with the bed-plate and capable of being moved vertically thereon and provided with a beveled face, a pattern having a beveled face to engage the beveled face of the gaging-ring, and means to lock the gaging-ring in its adjusted position.

6. In a wood-shaping machine, the combination with a bed-plate having an opening and a vertical spindle extending through the opening and carrying a rotary cutter-head, of a ring mounted in the bed-plate and movable in a direction parallel with the axis of the spindle and having a beveled pattern-engaging portion normally disposed above the bed-plate, a pattern having a beveled face to engage the beveled portion of the ring, and means for locking the ring in its adjusted position.

7. In a wood-shaping machine, a bed-plate having an opening and a recess formed in the edge of said opening, a vertical spindle extending through said opening, a cutter-head carrying cutters mounted on said spindle, a ring having a threaded engagement with the bed-plate and provided with a beveled face and also having a plurality of recesses in its periphery, a pattern having a beveled face to engage the beveled face of the ring, and a locking-pin to engage the recesses in the ring and bed-plate to hold the former in its adjusted position.

In testimony whereof I affix my signature in presence of two witnesses.

FRANK P. KELLEY.

Witnesses:
  GEORGE OLTSCH,
  MAGGIE KNOBLOCK.